Patented Oct. 13, 1953

2,655,504

UNITED STATES PATENT OFFICE 2,655,504

N,N - DISUBSTITUTED AMINOALKANOL ESTERS OF α,α-DIACYLTOLUIC ACIDS AND THEIR SALTS

Carl Peter Krimmel, Mundelein, Ill., assignor to G. D. Searle & Co., Chicago, Ill., a corporation of Illinois No Drawing. Application March 6, 1951,
Serial No. 214,211

15 Claims. (Cl. 260—294.3)

This invention relates to basic esters of substituted toluic acids, and more particularly to N,N-disubstituted aminoalkanol esters of α,α-diaryl substituted o-, m-, and p-toluic acids, salts thereof, and methods for their production.

The present application is a continuation-in-part of my copending applications, Serial No. 149,021, filed March 10, 1950, now abandoned, and Serial No. 154,205, filed April 5, 1950, now abandoned.

By this invention I have provided new compositions of matter which may be represented by the following structural formula

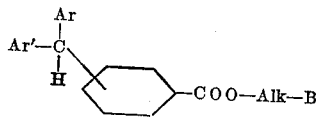

wherein Ar and Ar' are aryl groups, wherein Alk is an alkylene radical and wherein B is a member of the class comprising dialkylamino radicals and radicals of the type —NX which are attached through the nitrogen to the Alk radical and in which X is a member of the class comprising alkylene and ethyleneoxyethylene radicals.

In the foregoing structural formula Ar and Ar' may represent such lower aryl groups as phenyl, o-, m-, and p-tolyl, o-, m-, and p-anisyl and the like. The Alk group represents bivalent, saturated, aliphatic hydrocarbon radicals of from two to eight carbon atoms. These radicals are derived from straight-chain or branched-chain aliphatic hydrocarbons and include radicals such as ethylene, propylene, butylene, amylene, and polymethylene radicals such as trimethylene, tetramethylene, pentamethylene, and hexamethylene. Among the radicals which B may represent are dialkylamino radicals of the type NRR'; wherein R and R' are such lower alkyl groups as methyl, ethyl, propyl, butyl, amyl, and hexyl; and wherein the propyl, butyl, amyl, and hexyl groups may be of the straight-chain, branched-chain or cyclic type. The radical B may also be a saturated, nitrogen-containing heteromonocyclic radical such as a N-piperidino, N-lupetidino, N-pyrrolidino, and N-morpholino radical.

The organic bases of the foregoing type form salts with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, oxalic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The esters of this invention have been found to possess a number of useful therapeutic properties. Thus, they are effective spasmolytics and cardiovascular drugs. They are also effective vasodilators.

The acids which constitute the starting materials for the esters of this invention are prepared by conventional methods, such as that of Drory (Ber. Deut. Chem. Ges. 24, 2572; 1891). Thus, α,α-diphenyl-o-toluic acid, M. P. 161–164° C., is prepared by causing o-cyanobenzal chloride, benzene and aluminum chloride to react to obtain o-cyanotriphenylmethane, which is hydrolyzed to the acid with 25% alcoholic potassium hydroxide. The o-cyanobenzal chloride is conveniently obtained by the chlorination of o-tolylnitrile by ultraviolet radiation. In the same manner, starting with m-tolylnitrile and p-tolylnitrile, α,α-diphenyl-m-toluic acid, M. P. 180–182° C. and α,α-diphenyl-p-toluic acid, M. P. 163–165° C. are obtained.

α,α - Di - o - tolylphenylmethane-o-carboxylic acid, M. P. 239–240° C., is prepared by the reduction of di-o-tolylphthalide with 5% sodium amalgam in ethanol. The phthalide in turn is prepared by the Grignard reaction using o-bromotoluene and phthalic anhydride dissolved in benzene.

My invention is disclosed in further detail by the following examples which are set forth for the purpose of illustrating this invention and which are in no way to be construed as limiting the invention in spirit or in scope. It will be apparent to those skilled in the art that many conventional modifications in methods, conditions and materials can be adopted without departing therefrom.

In the examples, the temperatures given refer to degrees centigrade (° C.), the parts by weight to grams (g.), the parts by volume to milliliters (ml.), and the pressures during vacuum distillation in millimeters (mm.) of mercury.

EXAMPLE 1

2-diethylaminoethyl ester of α,α-diphenyl-o-toluic acid

A solution of sodium isopropylate, containing 2.0 g. of sodium, in 200 ml. of isopropanol, is treated with 25.0 g. of α,α-diphenyl-o-toluic acid. To this mixture 14.9 g. of the hydrochloride of 2-chloroethyldiethylamine in 200 ml. of isopropanol are added, and after stirring and heating at reflux temperature for four hours, the isopropanol is distilled off under vacuum. The crystalline product is washed with 200 ml. of isopropanol, filtered, and recrystallized from absolute ethanol, using charcoal as a clarifying agent. 18.7 g. of white crystalline hydrochloride are obtained, which melt at 146–148.5° C. It has the structural formula

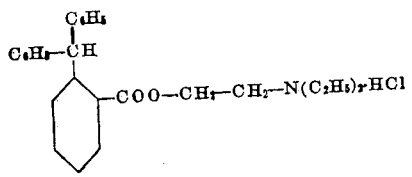

EXAMPLE 2

α,α-Diphenyl-o-toluic acid ester of β-hydroxyethyl-triethyl ammonium bromide 10 g. of the 2-diethylaminoethyl ester of α,α-diphenyl-o-toluic acid, prepared as in Example 1, are heated for 3 hours in a pressure bottle with 5.6 g. of ethyl bromide and 20 ml. of butanone. After cooling, the crystals are washed with butanone and dried. 5.2 g. of the bromide are thus obtained which on recrystallization from butanone form white flakes melting at 194–196° C. with decomposition. It has the structural formula

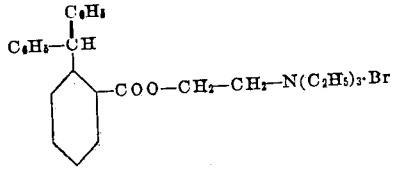

EXAMPLE 3

2-diethylaminopropyl ester of α,α-diphenyl-o-toluic acid

To a stirred solution of 28.8 g. of α,α-diphenyl-o-toluic acid in 500 ml. of anhydrous isopropanol, 15.0 g. of 2-diethylaminopropyl chloride are added in one batch, and the mixture is maintained at reflux temperature for 3 hours. The isopropanol is distilled off under vacuum, the residue taken up in water, extracted with ether, and made alkaline. The oily base is extracted with ether, and the extract dried over potassium carbonate and evaporated. Vacuum distillation of the residue yields 22.0 g. of a colorless, viscous oil which boils at 225–231° C. and 1.1 mm. pressure. To a solution of 12.0 g. of this base in 3 liters of ether, an equivalent of a 25% solution of hydrogen chloride in isopropanol is added with stirring. The hydrochloride is washed with ether, dried, and recrystallized from butanone, to obtain white crystals which melt at 135–137° C. It has the structural formula

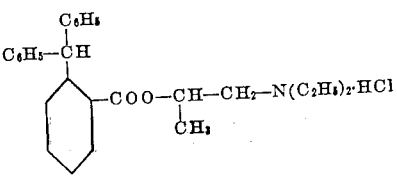

EXAMPLE 4

3-diethylaminopropyl ester of α,α-diphenyl-o-toluic acid

To a stirred refluxing solution of 28.8 g. of α,α-diphenyl-o-toluic acid in anhydrous isopropanol, 15.0 g. of 3-diethylaminopropyl chloride are added in one batch. The mixture is heated for three hours, after which the solvent is removed in vacuo, the residue taken up in water, the milky solution extracted with ether, made alkaline, and the base purified as in Example 3. Thus 13.1 g. of a clear viscous oil, boiling at 229–236° C. and 0.5 mm. pressure are obtained. The hydrochloride, prepared as in Example 3, is precipitated in the form of a colloidal powder, which later turns crystalline. Washing with ether yields white crystals melting at 131–133° C.

EXAMPLE 5

α,α-Diphenyl-o-toluic acid ester of γ-hydroxypropyl-triethylammonium bromide 12.0 g. of the 3-diethylaminopropyl ester of α,α-diphenyl-o-toluic acid, 5.6 g. of ethyl bromide and 20 ml. of butanone are heated in a pressure bottle for 3 hours. Crystallization is induced by treatment of the cooled product with a small quantity of ether. 13.1 g. of cream-colored crystals are thus obtained, which on recrystallization from butanone melt at 148–150° C.

EXAMPLE 6

3-di-n-propylaminopropyl ester of α,α-diphenyl-o-toluic acid 28.8 g. of α,α-diphenyl-o-toluic acid are heated with 20 ml. of thionyl chloride and 200 ml. of carbon tetrachloride at reflux temperature for two hours. The excess thionyl chloride and the carbon tetrachloride are removed under vacuum and the solid residue is taken up in 200 ml. of acetone. Then 15.9 g. of 3-di-n-propylaminopropanol are added, and the mixture heated at reflux temperature for 3 hours. The acetone is removed under vacuum, the residue is taken up in water, the neutral material is extracted with ether, and the aqueous layer is made alkaline with potassium hydroxide. The oily base is extracted with ether, and the ether extract is dried over potassium carbonate. The ether is evaporated. Vacuum distillation yields 22.3 g of the ester in the form of a viscous yellow oil boiling at 236–246° C. and 0.6 mm. pressure.

7.0 g. of this base are dissolved in ether and an equivalent of a 25% solution of hydrogen chloride in isopropanol is slowly added with stirring. The white crystalline precipitate is filtered, washed with ether, and dried in a vacuum desiccator. 9.0 g. of crystals are obtained which, on recrystallization from acetone, melt at 156–158° C.

EXAMPLE 7

2-diethylaminoethyl ester of α,α-di(o-tolyl)-o-toluic acid

In the manner of Example 3, a solution of 37.0 g. of α,α-di-o-tolylphenylmethane-o-carboxylic acid in 400 ml. of isopropanol and 16.3 g. of 2-diethylaminoethyl chloride are caused to react. There are obtained by vacuum distillation 24.1 g. of colorless syrup boiling at about 218–224° C. and 0.5 mm. pressure. To a solution of 14.0 g. of 2-diethylaminoethyl ester of α,α-di(o-tolyl)-o-toluic acid, dissolved in 1000 ml. of anhydrous ethyl ether, is added an equivalent of hydrogen chloride as a 25% solution in anhydrous isopropanol. The powdery white precipitate is suction filtered, ether washed, and dried. There is obtained, upon crystallization from butanone, 10.2 g. of a white, water-soluble, crystalline solid melting at 179–180° C. The base has the structural formula

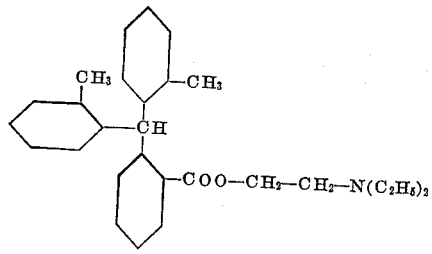

EXAMPLE 8

β-(N-piperidino)ethyl ester of α,α-diphenyl-o-toluic acid

A stirred refluxing solution of 28.8 g. of α,α-diphenyl-o-toluic acid in 500 ml. of anhydrous isopropanol is treated with 14.8 g. of N-(β-chloroethyl)piperidine and maintained at reflux temperature for 5 hours. The isopropanol is then distilled off under vacuum, and the residue taken up in 800 ml. of hot water and filtered. The yellow filtrate is decolorized with charcoal and concentrated. 14.0 g. of white crystals are obtained which melt at 216–217° C.

In the identical manner the β-(N-lupetidino)-ethyl ester of α,α-diphenyl-o-toluic acid and β-(N-pyrrolidino)ethyl ester of α,α-diphenyl-o-toluic acid are obtained.

EXAMPLE 9

β-(N-morpholino)ethyl ester of α,α-di-o-tolyl-o-toluic acid 31.6 g. of α,α-di-o-tolyl-o-toluic acid are reacted in isopropanol solution with 15 g. of N-(β-chloroethyl)morpholine at reflux temperature for 5 hours. The isopropanol is then distilled off and the residue is purified as in Example 8.

EXAMPLE 10

2-diethylaminoethyl ester of α,α-diphenyl-m-toluic acid

In the manner of Example 3, a solution of 29.0 g. of triphenylmethane-3-carboxylic acid in 400 ml. of anhydrous isopropanol and 13.6 g. of 2-diethylaminoethyl chloride are caused to react. Vacuum distillation of the residue yields 20 g. of the 2-diethylaminoethyl ester of α,α-diphenyl-m-toluic acid which is a colorless syrup boiling at about 224–238° C. and 0.3 mm. pressure. A solution of 17.0 g. of the 2-diethylaminoethyl ester of α,α-diphenyl-m-toluic acid in 25 ml. of butanol is mixed with an equivalent of hydrogen chloride as a 25% solution in isopropanol. The reaction mixture is diluted with 1000 ml. of anhydrous ethyl ether and scratched to induce crystallization. The resultant crystalline precipitate is suction filtered and dried. After recrystallization from butanone, 12.1 g. of 2-diethylaminoethyl α,α-diphenyl-m-toluate hydrochloride are obtained as a white, water-soluble powder melting at 141.0–142.5° C. It has the structural formula

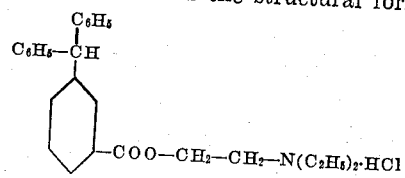

EXAMPLE 11

3-diethylaminopropyl ester of α,α-diphenyl-m-toluic acid

In the manner of Example 10, a solution of 29.0 g. of triphenylmethane-3-carboxylic acid in 400 ml. of anhydrous isopropanol and 15.0 g. of 3-diethylaminopropyl chloride are caused to react. The 3-diethylaminopropyl ester of α,α-diphenyl-m-toluic acid is obtained as 14.3 g. of a colorless syrup boiling at about 238–247° C. and 0.5 mm. pressure.

EXAMPLE 12

2-diethylaminoethyl ester of α,α-diphenyl-p-toluic acid

To a refluxing solution of 28.8 g. of α,α-diphenyl-p-toluic acid in 500 ml. of anhydrous isopropanol are added 13.6 g. of 2-diethylaminoethyl chloride in one batch. The reaction mixture is refluxed for a period of 4 hours and the isopropanol is removed by vacuum distillation on the steam bath. The residue is taken up in water and made alkaline with potassium hydroxide. The released oil is ether extracted and the extract is dried over anhydrous potassium carbonate. The extract is filtered, ether stripped and vacuum distilled to give 18 g. of colorless oil which boils at 249–255° C. and 1.5 mm. pressure.

To a solution of 13 g. of the 2-diethylaminoethyl ester of α,α-diphenyl-p-toluic acid in 1000 ml. of anhydrous ethyl ether are added 4.8 ml. of a 25% solution of hydrogen chloride in anhydrous isopropanol. A gelatinous, white hydrochloride is precipitated. This material is suction filtered, ether washed and recrystallized from methyl ethyl ketone. In this manner, 9.1 g. of a hydrochloride which has a melting point of 155.0–156.5° C. are obtained. It has the structural formula

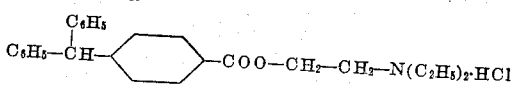

EXAMPLE 13

α,α-Diphenyl-p-toluic acid ester of 2-hydroxyethyltriethylammonium bromide

A solution of 11.5 g. of the 2-diethylaminoethyl ester of α,α-diphenyl-p-toluic acid, 6.5 g. of ethyl bromide and 20 ml. of methyl ethyl ketone is sealed in a shielded pressure bottle and heated in a steam bath for 3 hours. To the cooled, depressurized solution 5 ml. of anhydrous ethyl ether are added and the pressure bottle is resealed and placed in the icebox for one day. The solid white product is washed with 100 ml. of cold methyl ethyl ketone and recrystallized from 1700 ml. of hot methyl ethyl ketone. By concentration of the solvent, there are obtained 6.2 g. of colorless leaflets melting at 177–178° C.

EXAMPLE 14

3-diethylaminopropyl ester of α,α-diphenyl-p-toluic acid

To a refluxing solution of 40 g. of α,α-diphenyl-p-toluic acid in 500 ml. of isopropanol are added 21 g. of 3-diethylaminopropyl chloride in one batch. After refluxing the reaction mixture for a period of 4 hours, the isopropanol is removed by vacuum distillation on the steam bath. The residue is taken up in water and made alkaline with potassium hydroxide. The released oil is extracted with ether, and the extract is dried over anhydrous potassium carbonate. From the filtered, ether-stripped extract there are obtained 31 g. of colorless oil boiling at 248–260° C. and 0.6 mm. pressure.

To a solution of 15 g. of the 3-diethylaminopropyl ester of α,α-diphenyl-p-toluic acid in 1000 ml. of anhydrous ethyl ether are added 5.6 ml. of a 25% solution of hydrogen chloride in anhydrous isopropanol. The resultant hydrochloride is recrystallized from methyl ethyl ketone to give 13.5 g. of colorless rod-shaped crystals which melt at 163.5–164.5° C.

EXAMPLE 15

α,α-Diphenyl-p-toluic acid ester of 3-hydroxypropyltriethylammonium bromide

A solution of 12.5 g. of the 3-diethylaminopropyl ester of α,α-diphenyl-p-toluic acid, 6.8 g. of ethyl bromide and 20 ml. of methyl ethyl ketone is sealed in a shielded pressure bottle and heated on the steam bath for 3 hours. After preliminary cooling and pressure release, crystallization of the quaternary salt is induced by cooling in the icebox. The quaternary salt is filtered, washed with 100 ml. of methyl ethyl ketone and recrystallized from methyl ethyl ketone. A yield of 9.3 g. of white needles melting at 158.5–159.5° C. is obtained.

EXAMPLE 16

2-dimethylaminoethyl ester of α,α-di-o-tolyl-p-toluic acid

A stirred refluxing solution of 31.6 of α,α-di-o-tolyl-p-toluic acid in 700 ml. of anhydrous iso-propanol is treated with 13.5 g. of 2-dimethylaminoethyl chloride which is added in one batch. The reaction mixture is refluxed for 4 hours and the isopropanol distilled off under vacuum on the steam bath. The residue is taken up in water and sodium hydroxide is added until the solution becomes alkaline. An oil separates which is extracted with ether and the extract is dried over anhydrous potassium carbonate. The extract is filtered and upon evaporation, the oily 2-dimethylaminoethyl ester of α,α-di-o-tolyl-p-toluic acid is obtained. It is soluble in ether and in related solvents and forms crystalline salts with acids such as hydrochloric and hydrobromic acids.

EXAMPLE 17

2-(N-piperidino)ethyl ester of α,α-diphenyl-p-toluic acid 9.5 g. of α,α-diphenyl-p-toluic acid in 200 ml. of anhydrous isopropanol are heated for 5 hours with 4.8 g. of N-(β-chloroethyl)piperidine. The isopropanol is distilled off under vacuum, and the residue is made alkaline by the addition of a strong aqueous solution of potassium hydroxide. The 2-(N-piperidino)ethyl ester of α,α-diphenyl-p-toluic acid is extracted with ether and the extract is dried over anhydrous potassium carbonate. From the filtered, ether-stripped extract, the desired base is obtained as an oil. It is soluble in ether and in other related nonpolar solvents and forms crystalline salts with acids such as hydrochloric and hydrobromic acids.

I claim:

1. A member of the class of compounds consisting of a basic ester of an α,α-diaryltoluic acid and salts thereof, said basic ester having the formula $$\text{Ar'}-\overset{\text{Ar}}{\underset{}{\text{CH}}}-\text{C}_6\text{H}_4-\text{COO}-\text{Alk}-\text{B}$$

wherein Ar and Ar' are aromatic hydrocarbon radicals containing not more than 7 carbon atoms, Alk is a lower alkylene radical containing at least 2 carbon atoms and B is an amino radical selected from the class consisting of di(lower alkyl)amino, morpholino, lupetidino, pyrrolidino and piperidino radicals.

2. A dialkylaminoalkyl ester of an α,α-diphenyltoluic acid, having the formula $$\text{C}_6\text{H}_5-\overset{\text{C}_6\text{H}_5}{\underset{}{\text{CH}}}-\text{C}_6\text{H}_4-\text{COO}-\text{Alk}-\text{NRR'}$$

wherein Alk is a lower alkylene radical containing at least 2 carbon atoms and R and R' are lower alkyl radicals.

3. A di(lower alkyl)aminoethyl ester of an α,α-diphenyltoluic acid.

4. 2-diethylaminoethyl α,α-diphenyl-o-toluate.

5. A quaternary ammonium salt of a dialkylaminoalkyl ester of an α,α-diphenyltoluic acid, having the formula $$\text{C}_6\text{H}_5-\overset{\text{C}_6\text{H}_5}{\underset{}{\text{CH}}}-\text{C}_6\text{H}_4-\text{COO}-\text{Alk}-\overset{R\ \ R'}{\underset{X\ \ R''}{N}}$$

wherein Alk is a lower alkylene radical containing at least 2 carbon atoms; R, R' and R'' are lower alkyl radicals and X is one equivalent of an anion.

6. A quaternary ammonium salt of 2-diethylaminoethyl α,α-diphenyl-o-toluate, having the formula $$\text{C}_6\text{H}_5-\overset{\text{C}_6\text{H}_5}{\underset{}{\text{CH}}}-\text{C}_6\text{H}_4-\text{COO}-\text{CH}_2\text{CH}_2-\overset{\text{C}_2\text{H}_5}{\underset{X\ \ \text{C}_2\text{H}_5}{N_{\text{C}_2\text{H}_5}}}$$

wherein X is one equivalent of an anion.

7. 2-diethylaminoethyl α,α-diphenyl-o-toluate ethobromide.

8. A dialkylaminoalkyl ester of an α,α-ditolyltoluic acid, having the formula $$\text{CH}_3-\text{C}_6\text{H}_4-\overset{\text{C}_6\text{H}_4-\text{CH}_3}{\underset{}{\text{CH}}}-\text{C}_6\text{H}_4-\text{COO}-\text{Alk}-\text{NRR'}$$

wherein Alk is a lower alkylene radical containing at least 2 carbon atoms and R and R' are lower alkyl radicals.

9. A di(lower alkyl)aminoethyl ester of an α,α-ditolyltoluic acid.

10. 2-diethylaminoethyl α,α-di(o-tolyl)-o-toluate.

11. A piperidinoethyl α,α-diphenyltoluate.

12. β-(N-piperidino)ethyl α,α-diphenyl-o-toluate.

13. A dialkylaminopropyl ester of an α,α-diphenyltoluic acid, having the formula

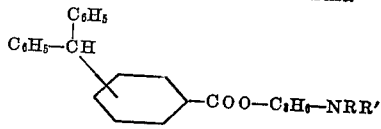

wherein R and R' are lower alkyl radicals.

14. A diethylaminopropyl α,α-diphenyltoluate.

15. 2-diethylaminopropyl α,α-diphenyl-o-toluate.

CARL PETER KRIMMEL.

References Cited in the file of this patent

Jones et al.: J. Am. Chem. Soc., vol. 48, pp. 181–195 (1926).

Marvel et al.: J. Am. Chem. Soc., vol. 63, pp. 2221–2222 (1941).